(12) United States Patent
Prasad

(10) Patent No.: US 12,206,801 B2
(45) Date of Patent: Jan. 21, 2025

(54) DIGITAL IDENTITY AUTHENTICATION SYSTEM AND METHOD

(71) Applicant: Visa International Service Association, San Francisco, CA (US)

(72) Inventor: Ranjiva Kant Prasad, Hampshire (GB)

(73) Assignee: Visa International Service Association, San Francisco, CA (US)

( * ) Notice: Subject to any disclaimer, the term of this patent is extended or adjusted under 35 U.S.C. 154(b) by 130 days.

(21) Appl. No.: 17/411,273

(22) Filed: Aug. 25, 2021

(65) Prior Publication Data

US 2023/0066754 A1    Mar. 2, 2023

(51) Int. Cl.
*H04L 9/32* (2006.01)
*G06K 19/06* (2006.01)

(52) U.S. Cl.
CPC ...... *H04L 9/3271* (2013.01); *G06K 19/06037* (2013.01); *H04L 9/321* (2013.01); *H04L 9/3231* (2013.01); *H04L 9/3234* (2013.01)

(58) Field of Classification Search
CPC ..... H04L 9/3271; H04L 9/321; H04L 9/3231; H04L 9/3234; G06K 19/06037
See application file for complete search history.

(56) References Cited

U.S. PATENT DOCUMENTS

| | | | |
|---|---|---|---|
| 9,805,362 B2 | 10/2017 | Kobylkin et al. | |
| 10,789,353 B1* | 9/2020 | Taylor | G06T 19/006 |
| 11,438,317 B2* | 9/2022 | Kaippallimalil | H04L 63/0428 |
| 2005/0222961 A1 | 10/2005 | Staib et al. | |
| 2011/0238573 A1* | 9/2011 | Varadarajan | G06Q 20/1085 |
| | | | 705/43 |
| 2015/0032617 A1* | 1/2015 | Canis | G06Q 20/4016 |
| | | | 705/44 |
| 2017/0004483 A1* | 1/2017 | Runyan | G06Q 20/325 |
| | | | 713/168 |
| 2017/0344990 A1* | 11/2017 | Kohli | G06Q 20/326 |
| 2018/0026973 A1* | 1/2018 | Le Saint | H04W 12/069 |
| | | | 713/168 |
| 2019/0050933 A1* | 2/2019 | Yoo | G06Q 20/322 |
| 2019/0052466 A1* | 2/2019 | Bettger | H04L 63/123 |
| 2019/0303928 A1* | 10/2019 | Kaladgi | G06Q 20/385 |

(Continued)

FOREIGN PATENT DOCUMENTS

| | | |
|---|---|---|
| WO | 2018111302 A1 | 6/2018 |
| WO | 2020076854 A2 | 4/2020 |
| WO | 2021091524 | 5/2021 |

OTHER PUBLICATIONS

EP22190966.6, "Extended European Search Report", Jan. 16, 2023, 5 pages.
EP22190966.6, "Intention to Grant", Apr. 8, 2024, 8 pages.

*Primary Examiner* — Jason K Gee
*Assistant Examiner* — Brian William Avery
(74) *Attorney, Agent, or Firm* — Kilpatrick Townsend & Stockton LLP

(57) ABSTRACT

A method for authenticating a user performed by an identity server computer is disclosed. The method comprises receiving, by a server, a user device identifier from an access device. The server transmits a challenge to a mobile device operated by a user, and the mobile device signs the challenge. The server receives and verifies the signed challenge and then provides the signed challenge or a portion thereof to an access device, which processes the transaction with the signed challenge.

20 Claims, 7 Drawing Sheets

(56) References Cited

U.S. PATENT DOCUMENTS

| | | | |
|---|---|---|---|
| 2020/0145823 A1* | 5/2020 | Nair | H04W 12/06 |
| 2020/0334345 A1* | 10/2020 | Young | G06F 21/32 |
| 2020/0358614 A1* | 11/2020 | Fiske | H04L 9/0637 |
| 2021/0004811 A1* | 1/2021 | Zhou | G06Q 20/40145 |
| 2021/0081947 A1* | 3/2021 | Hockey | G06F 21/62 |
| 2021/0142602 A1* | 5/2021 | Bartlett | G07C 9/00309 |

* cited by examiner

DIGITAL IDENTITY AUTHENTICATION SYSTEM AND METHOD

CROSS-REFERENCES TO RELATED APPLICATIONS

None.

BACKGROUND

Data security in transactions is a problem to be addressed. Current methods to secure transactions such as access transactions can include using passwords or biometrics to authenticate a user. Such passwords or biometrics can be entered at an access device and the user may be granted access to a resource if the entered data is correct. However, such conventional methods may not be secure and can be improved. For instance, a user's password could be stolen and used by an unauthorized person. Further, it may be possible to hack into a database that stores the user's biometric and transmit it to the access device, so the biometric of the user may not be completely effective at preventing fraud.

Additionally, many conventional methods require a user to physically interact with the access device to access the desired resource. Physical interaction with access devices can be undesirable, especially when there are pathogens such as COVID-19 are in the environment.

Embodiments of the disclosure address this problem and other problems individually and collectively.

SUMMARY

One embodiment of the invention includes a method, receiving, by an identity server computer, a credential or derivative thereof from an access device in a transaction; responsive to receiving the credential or derivative thereof, transmitting, by the identity server computer, a challenge to a mobile device operated by a user; receiving, by the identity server computer, a signed challenge, wherein the signed challenge is signed using a private key on the mobile device; verifying, by the identity server computer, the signed challenge using a public key associated with the private key; and transmitting, by the identity server computer, the signed challenge or a portion thereof to the access device, wherein the access device generates an authorization request message comprising the signed challenge or the portion thereof.

Another embodiment of the invention is related to an identity server computer. The identity server computer comprising: a processor; and a non-transitory computer readable medium comprising instructions executable by the processor to perform operations including: receiving, by an identity server computer, a credential or derivative thereof from an access device in a transaction; responsive to receiving the credential or derivative thereof, transmitting, by the identity server computer, a challenge to a mobile device operated by a user; receiving, by the identity server computer, a signed challenge, wherein the signed challenge is signed using a private key on the mobile device; verifying, by the identity server computer, the signed challenge using a public key associated with the private key; and transmitting, by the identity server computer, the signed challenge or a portion thereof to the access device, wherein the access device generates an authorization request message comprising the signed challenge or the portion thereof.

Yet another embodiment of the invention includes a method. The method comprising: receiving, by an access device, a credential or derivative thereof from a user device of a user in a transaction; transmitting, by the access device to an identity server computer, the credential or derivative thereof; receiving, by the access device from the identity server computer, a signed challenge, the signed challenge created by a mobile device of a user; generating, by the access device, an authorization request message, comprising the signed challenge; transmitting, by the access device to a processing network computer, the authorization request message for authorization of the transaction.

Further details regarding embodiments of the invention are described below.

DETAILED DESCRIPTION

Figure 1:
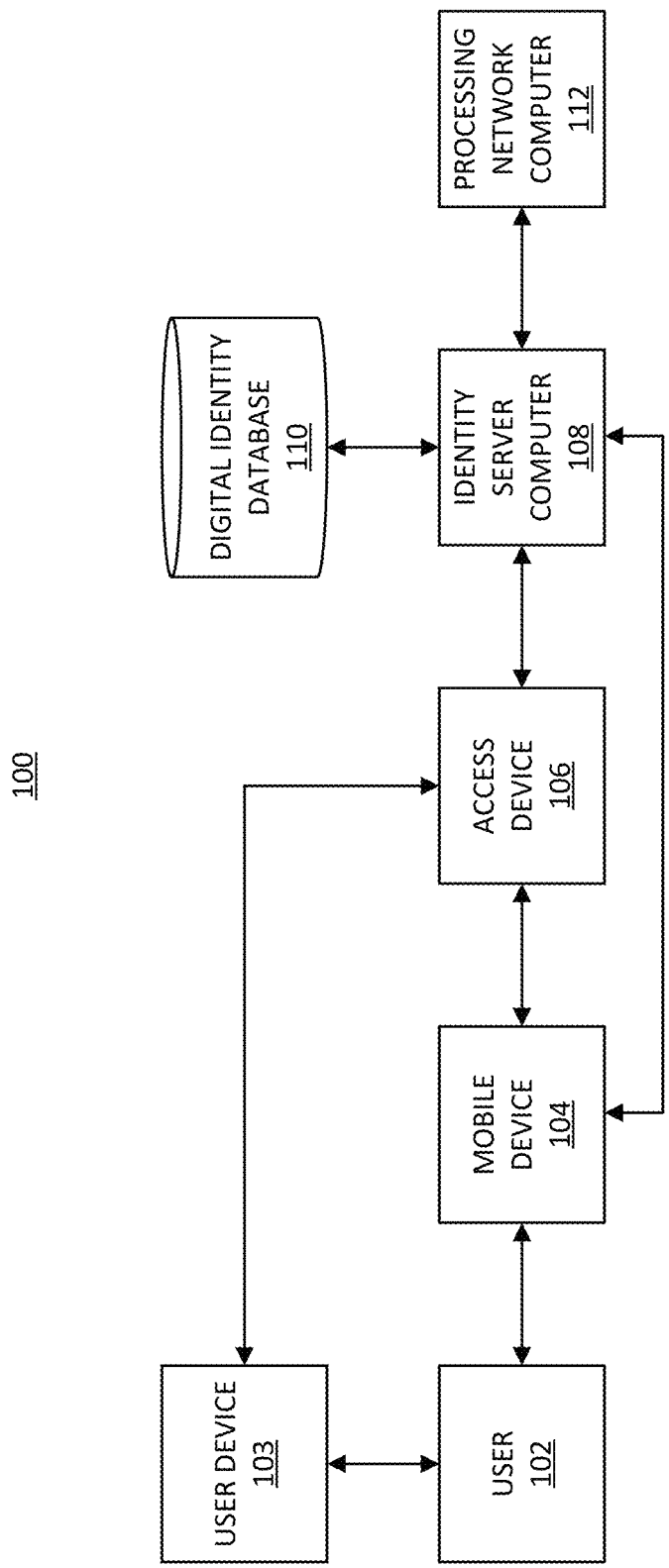
FIG. 1 shows a block diagram of an authentication system according to an embodiment of the invention.

Prior to discussing embodiments of the disclosure, some terms can be described in further detail.

A "user" may include an individual or a computational device. In some embodiments, a user may be associated with one or more personal accounts, user devices and/or mobile devices. In some embodiments, the user may be a cardholder, account holder, or consumer.

A "user device" may be any suitable device that a user can interact with (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, a mobile device may comprise a user device.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by an identity server computer.

A "resource provider" may be an entity that can provide a resource such as goods, services, information, and/or access. Examples of resource providers includes merchants, data providers, transit agencies, governmental entities, venue and dwelling operators, etc.

An "access device" may be any suitable device that provides access to a remote system and/or a resource. An access device may also be used for communicating with a merchant computer, a transaction processing computer, an authentication computer, or any other computer. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from user device or a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

A "key" or a "cryptographic key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of an authentication system 100 according to an embodiment of the invention.

In the authentication system 100, a user 102 can operate a user device 103 and a mobile device 104. In some embodiments, user device 103 may be a card such as a payment card held by the user 102, while the mobile device 104 may be a smartphone operated by the user 102. In some embodiments, the mobile device 104 may comprise the user device 103, and can be embodied by a single device. For example, the mobile device 104 may be a smartphone and the user device 103 may be virtual access card (e.g., a virtual payment card) on the user device 103.

The user device 102 can communicate with the access device 106, typically through a short range communication mechanism such as NFC (near field communication), Wi-Fi™, or Bluetooth™.

The mobile device 104 can communicate with a remotely located identity server computer 108 through a network such as a Wi-Fi™ or cellular network. The identity server computer 108 may be in communication with a digital identity database 110, an access device 106, and a processing network computer 112. In some embodiments, an authorizing entity computer 114 that is operated by an authorizing entity such as an issuer can be in communication with the processing network computer 112.

The components in the system in FIG. 1 (as well as subsequent figures) can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); and Secure Hypertext Transfer Protocol (HTTPS).

Authentication processes that use the system in FIG. 1 will be described below with respect to FIGS. 3A-3B. However, prior to performing authentication, a user device identifier and a corresponding user device can be created, and can be bound to the user's identity. This process is described in further detail below with respect to FIG. 2.

Figure 2:
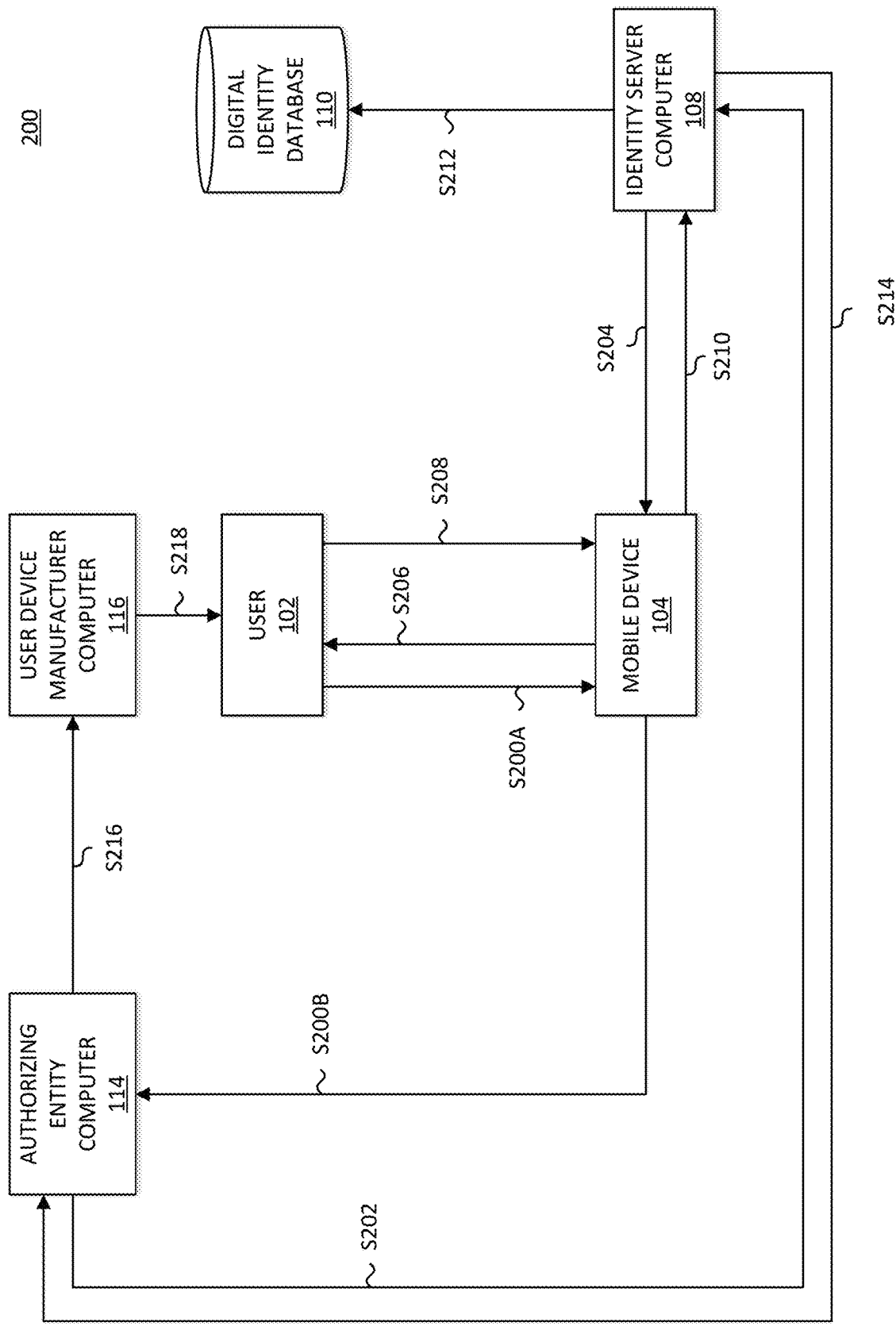
FIG. 2 shows a block diagram of a system for issuing a digital identity account from an existing account, and a process flow illustrating a method performed by the system.

FIG. 2 shows a block diagram of a system 200, and a corresponding process flow that includes a method of issuing a digital identity account using an existing account for a user held by an authorizing entity operating an authorizing entity computer 114. The system 200 includes many of the components in FIG. 1, and complete descriptions need not be repeated here.

FIG. 2 shows an authorizing entity computer 114 in communication with a user device manufacturer which may operate a user device manufacturer computer 116. The authorizing entity computer 114 may also communicate with a mobile device 104, which may be operated by a user 102. The mobile device 104 may be in communication with an identity server computer 108, which may in turn be in communication with a digital identity database 110.

The user 102 can have an existing account (e.g., a payment account) that is managed by the authorizing entity operating the authorizing entity computer 114. The existing account can be identified by a primary account identifier such as a primary account number. In some embodiments, the existing account, or primary account number, may also be identified by a user device identifier (e.g., a card identifier) on the user device. The user device identifier can be linked to the primary account number.

In some embodiments, the user 102 may wish to bind the existing account to a digital identity account using the primary account number. The digital identity account may be an account which stores account information of the user 102. The account information may comprise a public key of a public-private key pair generated by the mobile device 104. The private key of the public-private key pair is stored in a secure memory on the mobile device 104. The private key on the mobile device 104 may be accessed by a processor in the mobile device 104 after the mobile device 104 authenticates the user 102. In some embodiments, the digital identity account can be generated before or after the mobile device 104 generates the public-private key pair.

FIG. 2 is shown in the context of a user 102 obtaining a new user device from an authorizing entity operating the authorizing entity computer 114. The user 102 may initially request the user device from the authorizing entity computer 114, or the authorizing entity operating the authorizing entity computer 114 could provide the user device to the user 102 without any specific prompt from the user 102. The user device that is eventually obtained by the user 102 can have a code such as a QR code, which can be linked to a digital identity account in the digital identity database 110. The requested user device may be an access card such as an access badge, a payment card, etc.

In step S200A, the user 102 may input data into the mobile device 104 to cause the mobile device 104 to create a binding request. The binding request requests the generation of a binding between a primary account number and a digital identity account. As noted above, the primary account number may have been previously issued to the user 102 by the authorizing entity that operates the authorizing entity computer 114. The digital identity account may be managed by the identity server computer 108, and data pertaining to the digital identity account may be stored in the digital identity database 110.

In some embodiments, the binding request may be generated by an authorizing entity application (e.g., a banking application or a building access application) installed on the mobile device 104. In such embodiments, the authorizing entity application on the mobile device 104 can be specifically designed to communicate with the authorizing entity computer 114. Further, to generate the binding request, the user 102 may need to authenticate himself with the authorizing entity application (e.g., via a password or biometric).

The binding request may comprise a user device identifier such as card identifier that is linked to the primary account number. The user device identifier can be provided by the user 102, or it may have been automatically generated by the authorizing entity application on the mobile device 104. In some embodiments, the user device identifier can be an identifier that is separate from the primary account number. The user device identifier could be have the same form as the primary account number or could have a different form (e.g., the primary account number and the user device identifier may have a different number of characters).

In step S200B, after generating the binding request, the mobile device 104 may transmit the binding request to the authorizing entity computer 114.

In step S202, after receiving the binding request, the authorizing entity computer 114 can identify the primary account number linked to the user operating the mobile device 104. In some embodiments, the user's primary account number may be identified in response to the user authenticating himself to the authorizing entity application on the mobile device 104. The authorizing entity computer 114 may then modify the binding request to include account details associated with the primary account number. Exemplary account details may include the expiration date associated with the primary account number, the name of the user 102, the home address of the user 102, a mobile device identifier (e.g., a phone number, SIM card number, etc.) associated with the mobile device 104, etc. The modified binding request may include the primary account number, the user device identifier, and the account details. The authorizing entity computer 114 may then transmit the modified binding request to the identity server computer 108.

After receiving the binding request, the identity server computer 108 may identify the user 102 based on the account details in the binding request. For example, the identity server computer 108 may identify a digital identity account (identified by a digital identity account identifier) associated with the user 102 using account details such as a name of the user 102. In such embodiments, the identity server computer 108 may have previously issued a digital identity account to the user 102. The user 102 may have provided information such as his name to the identity server computer 108 in the prior registration process performed with the identity server computer 108.

During the prior registration process between the user's mobile device 104 and the identity server computer 108, the user may have downloaded an application such as an authenticator application from the identity server computer 108 to the mobile device 104. The authenticator application may have generated a public-private key pair, and then stored the private key in a secure memory (e.g., a secure element) on the mobile device 104. The authenticator application associated with the identity server computer 108 could then transmit the public key of the public-private key pair to the identity server computer 108 for storage in association with the digital identity account. The user 102 may have also provided information such as the user's home address, the mobile device identifier of the mobile device 104, etc., to the identity server computer 108 during the registration process. The user 102 may have also provided authentication data such as a secret or a reference biometric template to the authentication application so that it could be stored on the mobile device 104.

In step S204, the identity server computer 108 may generate a challenge and transmit the challenge to the mobile device 104. The challenge could be a random value or other data.

In step S206, after receiving the challenge, the authenticator application on the mobile device 104 may request that the user 102 to authenticate himself. For example, the user 102 may be required to provide a password, biometric, or separate authentication device to the authenticator application to authenticate. The data needed to authenticate the user 102 would be stored in a secure memory of the mobile device 104 and would be accessible to the authenticator application. For example, if the authentication process performed by the authenticator application is a biometric authentication process, then the user's biometric template (e.g., a retinal scan template, a fingerprint template, a facial template, etc.) would be stored in the mobile device 104. In some examples, the authentication may comprise one or more of a biometric authentication (e.g., measure the same biometric that was used to generate the digital identity account), a password authentication (e.g., input a password that was used to generate the digital identity account), presenting an authentication key (e.g., presenting a USB authentication key), etc.

In step S208, the user 102 may respond to the authentication request. For example, when the authentication request comprises a biometric authentication, the user 102 may use a biometric sensor (e.g., a camera, a fingerprint scanner, a microphone, etc.) in the mobile device 104 to measure a biometric (e.g., a facial scan, an iris scan, an ear scan, a fingerprint, a voice recording, etc.) and create a candidate biometric template from the biometric measurement. The biometric template may then be compared to a reference biometric template previously stored on the mobile device 104. If the two biometric templates match (e.g., they are similar as compared to some threshold difference allowed), then the mobile device 104 may access the private key associated with the digital identity account. The mobile device 104 may use the private key to sign the challenge.

In step S210, after generating the signed challenge, the mobile device 104 may transmit the signed challenge to the identity server computer 108.

In step S212, after receiving the signed challenge, the identity server computer 108 may verify the signed challenge using the public key associated with the digital identity account. After verifying the signed challenge, the identity server computer 108 may generate a binding of the primary account number received from the authorizing entity computer 114 to the digital identity account of the user 102 that is managed by the identity server computer 108. The identity server computer 108 may store the data (e.g., the account information, the user device identifier, etc.) received from the authorizing entity computer 114 along with the user's digital identity account identity information in the digital identity database 110.

In step S214, after associating the data from the authorizing entity computer 114 with the digital identity account, the identity server computer 108 may encrypt the user device identifier with a server key of a server key pair. The server key pair can include a symmetric key pair. The user device identifier may be an example of a credential and the encrypted user device identifier may be an example of a derivative of the credential. The identity server computer 108 may then transmit the encrypted user device identifier to the authorizing entity computer 114. While encryption of the user device identifier is desirable to protect the user device identifier, in other embodiments, the user device identifier need not be encrypted and can be sent as plaintext.

In step S216, after receiving the encrypted user device identifier and the other data from the identity server computer 108, the authorizing entity computer 114 may transmit a request to a user device manufacturer computer 116 to supply the user 102 with a user device comprising the encrypted card identifier. In some embodiments, the user device manufacturer computer 116 may generate a card with a memory encoding the encrypted card identifier, or a QR code that encodes the encrypted card identifier. In other embodiments, the encrypted card identifier may be simply printed on the card.

After receiving a request to supply a user device, the user device manufacturer computer 116 may create a user device. The user device may comprise the encrypted card identifier. For example, the user device manufacturer computer 116 may encode the encrypted card identifier in a QR code present on the user device. After creating the user device, in step S218, the user device manufacturer computer 116 may send the user device to the user 102 (e.g., via the mail or by download).

After obtaining the user device, the user 102 may use the user device in a transaction such as a financial transaction, a transaction to access a secure location, etc. Different authentication processes performed with such transactions are described with reference to FIGS. 3A-3B.

Figure 3A:
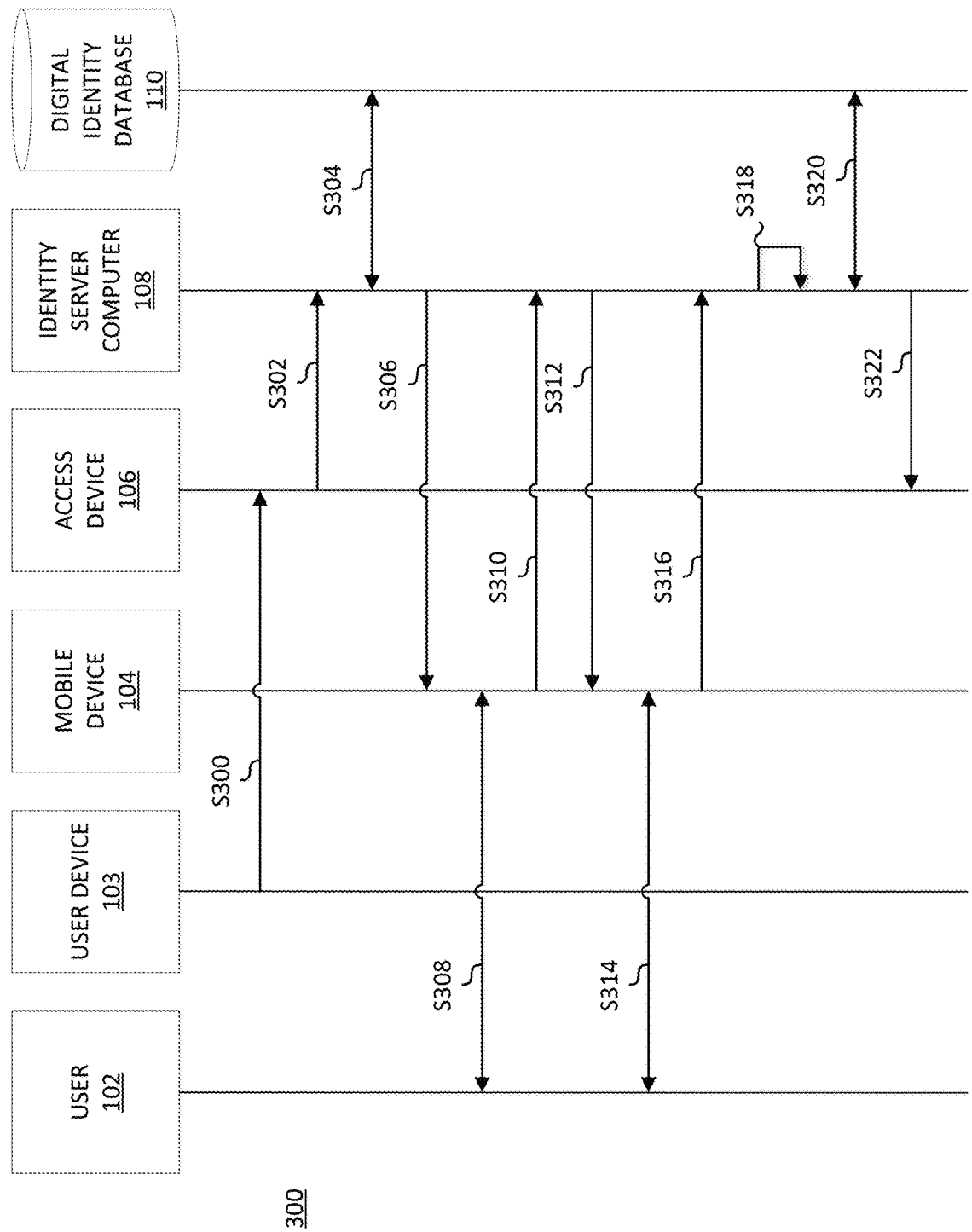
FIGS. 3A and 3B show a swimlane diagram for performing an authentication between a user and an access device according an some embodiments.
Figure 3B:
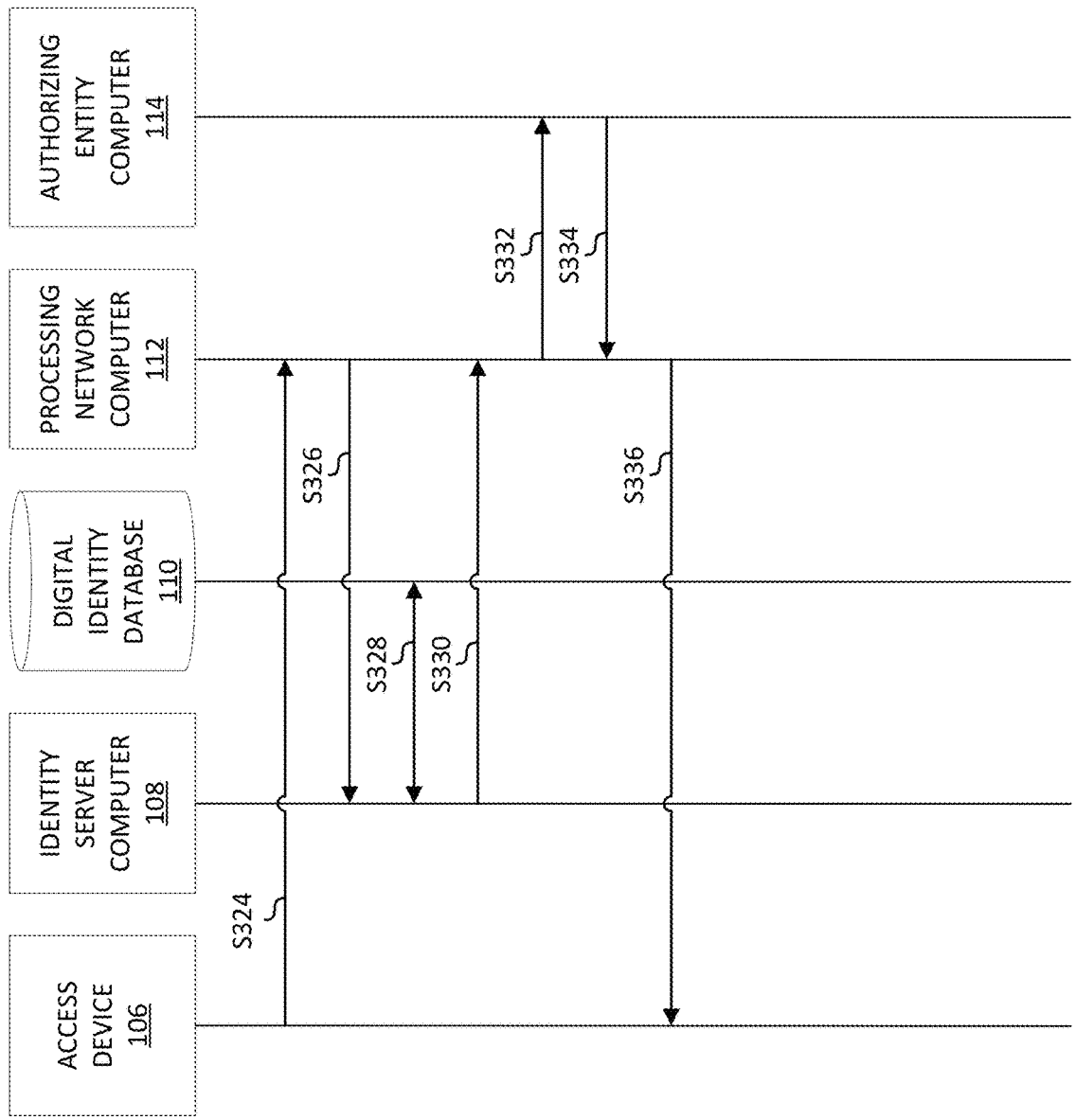

FIGS. 3A and 3B show a swimlane diagram illustrating an authentication process in a payment transaction such as a payment transaction in which a resource provider, such as a merchant that operates an access device such as a point of sale terminal, is proximate to a user during the payment transaction.

The user 102 may wish to transact with (e.g., purchase a good and/or service from) a resource provider operating the access device 106. For example, the user 102 may have a plurality of goods and/or services they wish to purchase from the resource provider. The resource provider may determine transaction details (e.g., a list of goods and/or services the user 102 wishes to purchase, a transaction amount, currency type, resource provider name, etc.) associated with the purchase. The processing network computer 112 or the authorizing entity computer 114 (not shown in FIG. 3A or 3B) may require that the user 102 authenticate himself before the transaction is authorized. This may be the case if the circumstances of the transaction exceed some predetermined risk threshold (e.g., the transaction amount is very high).

In step S300, the user 102 may initiate a transaction by presenting a QR code to the access device 106. The QR code may be presented by the user device 103. The QR code may encode the previously described user device identifier or the encrypted user device identifier. In the example of FIG. 3, the QR code encodes a derivative of a credential such as an encrypted user device identifier. The access device 106 may scan the presented QR code to receive the encrypted user device identifier.

In step S302, after receiving an encrypted user device identifier from the user 102, the access device 106 may determine that the transaction needs to be authenticated. For example, the access device 106 or a resource provider associated with the access device 106 may determine that the transaction amount included in the transaction details is greater than a threshold amount determined by the processing network computer 112 or the authorizing entity computer 114. If the transaction amount is greater than the threshold amount, then the access device 106 may transmit the encrypted user device identifier, and the transaction details to the identity server computer 108. The access device 106 may also transmit a session identifier to the identity server computer 108 so that subsequent messages can be tracked to the current interaction.

In step S304, after receiving the encrypted user device identifier from the access device 106, the identity server computer 108 may decrypt the encrypted user device identifier using the server key (e.g., described in step S214 of FIG. 2) to obtain the user device identifier. As noted above, in other embodiments, the user device identifier may be in plaintext, so no decryption would be needed in such embodiments. Once the user device identifier is obtained, the identity server computer 108 may then access a digital identity database 110 with the user device identifier to determine the digital identity account associated with the user 102. The digital identity account stores the user device identifier, the primary account number associated with the user device identifier, a digital account identifier, etc.

In step S306, after determining the digital identity account associated with the user device identifier and determining the mobile device identifier associated with the mobile device 104, the identity server computer 108 may transmit a transaction confirmation message comprising the transaction details (e.g., resource provider name, transaction amount, currency type, etc.) to the authenticator application on the mobile device 104.

In step S308, using the authenticator application, the mobile device 104 may display the transaction confirmation message to the user 102. The user 102 may choose to accept the transaction using the mobile device 104 (e.g., by pressing a confirmation button displayed on the mobile device 104).

In step S310, the mobile device 104 may then transmit a transaction confirmation message to the identity server computer 108.

After receiving the transaction confirmation message from the mobile device 104, the identity server computer 108 may generate a challenge. In some embodiments, the challenge may include various data elements including one or more data elements associated with the transaction. Such data elements may include data from one or more the transaction amount, an identifier for the access device, a resource provider identifier, a transaction identifier generated by the access device, etc. The challenge may include the one or more data elements concatenated together, or possibly truncated if the formed data string is too long. In step S312, the identity server computer 108 may then transmit the challenge to the mobile device 104.

After receiving a challenge, in step S314, the authentication application in the mobile device 104 may request that the user 102 authenticate himself. For example, the mobile device 104 may display, via the authenticator application, a request for the user 102 to provide a biometric (e.g., a fingerprint, a facial scan, a voice recording), or some other authentication data known to or possessed by the user 102. In response to the request, the user 102 may provide the authentication data to the mobile device 104.

After receiving the authentication data from the user 102, the authentication application in the mobile device 104 may compare the authentication data to previously stored authentication data in the mobile device 104. For example, the authentication data provided by the user 102 may be a face scan template, and this may be compared to a face scam template stored on the mobile device 304. If the provided authentication data and the stored authentication data match, then the authentication application on the mobile device 104 may access the previously described private key stored on the mobile device 104 (e.g., the private key securely stored on the mobile device 104 in step S208 of FIG. 2). The mobile device 104 and the authentication application may then sign the challenge using the private key to generate a signed challenge. In step S316, the signed challenge may then be transmitted to the identity server computer 108.

In step S318, after receiving the signed challenge from the mobile device 104, the identity server computer 108 may use the public key associated with the private key of step S316 (e.g., the public key that was stored in step S210) to verify the signed challenge.

In step S320, after verifying the signed challenge, the identity server computer 108 and confirming that the mobile device 104 is an authentic mobile device and that the user 102 is an authentic user, the identity server computer 108 may access the digital identity database 110 (e.g., using the digital identity account identifier of step S304) to retrieve account details (e.g., a primary account number, cardholder name, expiry date, etc.) stored in the database. This may also be done using the previously obtained user device identifier.

In step S322, after retrieving the account details, the identity server computer 108 may transmit the account details including the primary account number, expiration date, etc., and the signed challenge to the access device 106. The signed challenge may be in its original form or may be truncated so that a portion of the signed challenge is transmitted to the access device 106 instead of the entire signed challenge. The identity server computer 108 may also store the signed challenge in the user's digital identity account for later transaction verification.

Responsive to receiving the account information and the signed challenge, the access device 106 may generate an authorization request message comprising the account information and the signed challenge (or derivative thereof). The signed challenge be used as a cryptogram that can be used to prove that the transaction we properly authenticated. In step S324, the access device 106 may then transmit the authorization request message to the processing network computer 112.

In step S326, after receiving an authorization request message, the processing network computer 112 may transmit a validation request including the account information (e.g., the primary account number, expiration date, etc.) and the signed challenge to the identity server computer 108.

In step S328, upon receiving the validation request, the identity server computer 108 can then look up the digital identity account of the user 302 in the digital identity database 310 using the account information and can locate the public key associated with the user 302. The identity server computer 108 can then verify the signed challenge or cryptogram using the public key associated with the account information. In other embodiments, the identity server computer 108 previously stored the signed challenge (or portion thereof) and compares the stored signed challenge to the received signed challenge to determine if the transaction was previously authenticated. The identity server computer 108 may also retrieve additional account information (e.g., an expiration date) from the digital identity database 310 for further verification.

In step S330, after verifying the signed challenge or the cryptogram, and verifying the account information in the authorization request message, the identity server computer 108 may notify the processing network computer 112 that the transaction was authenticated. In some embodiments, the identity server computer 108 may generate a code which indicates that the transaction was previously authenticated and may provide this code to the processing network computer 312.

In step S332, after receiving the code indicating that the transaction was previously authenticated, the processing network computer 112 may modify the authorization request message to include the code or notification and may transmit it to the authorizing entity computer 114, which authorizes (or declines) the authorization request message. The authorizing entity computer 114 may use the code in its authorization decision process. If the code indicating that the identity server computer 108 authenticated the transaction was present in the authorization request message, then the authorizing entity computer 114 has assurance that the transaction is valid and not fraudulent. The authorizing entity computer 114 may then generate an authorization response message may transmit it to the processing network computer 112 in step S334.

In step S336, the processing network computer 112 may then transmit the authorization response message to the access device 106. The access device 106 may then display a confirmation to the user 102 that the transaction was successfully authorized.

In some embodiments, the processing network computer 112 need not transmit an authorization request message to the authorizing entity computer 114. Rather, the processing network computer 112 can make the authorization decision on its own for the authorizing entity computer 114.

Embodiments of the invention provide for a number of advantages. Embodiments of the invention can allow a user to be securely authenticated during a transaction such as a payment transaction or a transaction to access a secure location. As noted above, the user's mobile device can store a private key that is not known to any other device, and is only used when a user authenticates himself to his mobile device. Embodiments of the invention provide for a secure, and convenient method for performing multi-factor authentication in such transactions. Further, in some embodiments, the user's actual account information is not stored on his mobile device and is therefore not susceptible to being obtained through hacking or other means.

Additionally, in embodiments of the invention, the user does not need to come into contact with the access device itself in order to perform an authentication. Communication between the user/mobile devices, the access device, and the identity server computer are performed in a contactless manner. The user can gain access resources that would traditionally require the user to contact the access device (e.g., enter a PIN into a keypad of the access device to perform a transaction). This can be beneficial, especially when the transmission of viruses and other pathogens is of concern. Additionally, the signed challenge may be used in an authorization request message. The signed challenge can replace or supplement other data in a conventional authorization request message. For example, the signed challenge may replace the need for a conventional cryptogram in a transaction.

Figure 4:
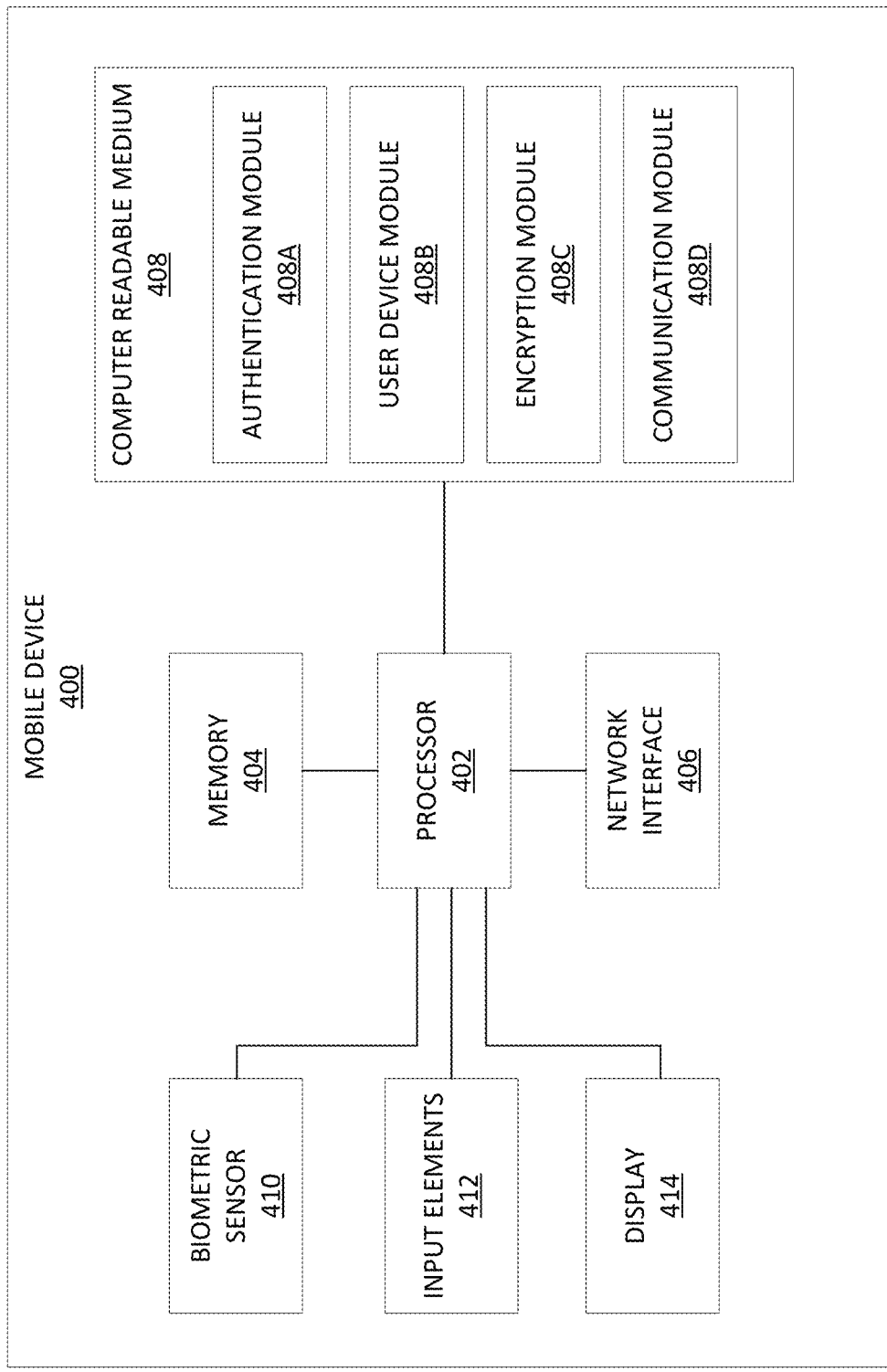
FIG. 4 shows a block diagram of an mobile device according to an embodiment.

FIG. 4 shows a block diagram of an exemplary mobile device 400. The mobile device 400 may be operated by a user. The mobile device 400 may comprise a processor 402. The processor 402 may be coupled to a memory 404, a network interface 406, a computer readable medium 408, a biometric sensor 410 (e.g., fingerprint sensor, camera, etc.), input elements 412 (e.g., keyboards, touchpads, microphones, etc., and a display 414. The computer readable medium 408 may comprise any suitable number and types of software modules.

The memory 404 may be used to store data and code. The memory 404 may be coupled to the processor 402 internally or externally (e.g., via cloud based data storage), and may comprise any combination of volatile and/or non-volatile memory such as RAM, DRAM, ROM, flash, or any other suitable memory device. In some embodiments, the memory 404 may securely store private keys of a public-private encryption key scheme.

The network interface 406 may include an interface that can allow the user device 400 to communicate with external computers and/or devices. The network interface 406 may enable the user device 400 to communicate data to and from another device such as an access device, an identity server computer, an authorizing entity computer, etc. Some examples of the network interface 406 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 406 may include Wi-Fi. Data transferred via the network interface 406 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 406 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 408 may comprise a number of software modules including, but not limited to, an authentication module 408A, a user device module 408B, an encryption module 408C, and a communication module 408D.

The authentication module 408A may comprise code that causes the processor 402 to generate and perform authentication of the user. The authentication module 408A may access the biometric sensor 410 and/or the input elements to receive authentication data. For example, the authentication module 408A may be used to perform multifactor authentication of the user including a biometric authentication (e.g., a facial scan, etc.) and a password authentication (e.g., comparing a password input to a stored password). The authentication module 408A, along with the communication module 408D, may allow the mobile device 400 to communicate directly with identity server computers.

The user device module 408B may comprise code that causes the processor 402 to simulate a user device. For example, the user device module 408B may cause the processor 402 to display a user device on the display 414. The user device module 408B may additionally execute functions relating to QR codes. For example, the user device module 408B may generate QR codes, so that it may be displayed on the display 414.

The encryption module 408C may comprise code that causes the processor 402 to encrypt and decrypt data. For example, the encryption module 408C may allow the mobile device 400 to generate public-private encryption key pairs. The encryption module 408C may store the private key of the key pair in memory 404. The encryption module 408C may be used to sign challenges with the private key.

The communication module 408D, in conjunction with the processor 402, can generate messages, forward messages, reformat messages, and/or otherwise communicate with other entities. For example, communication module 408D can be used to facilitate communications between the mobile device 400 and an authorizing entity computer, an access device, an identity server computer, etc. The communication module 408D may generate and verify communications between the mobile device 400 and external devices.

The biometric sensor 410 and input elements 412 may be used to receive data from a user. Examples of the biometric sensor 410 may be a camera, a microphone, a fingerprint sensor, etc. Input elements 412 may be a touchscreen, a keypad, a microphone, etc.

The display 414 may be used to display transaction confirmations, and authentication requests. The display 414 may be an display screen such as an OLED display, a video display, etc.

Figure 5:
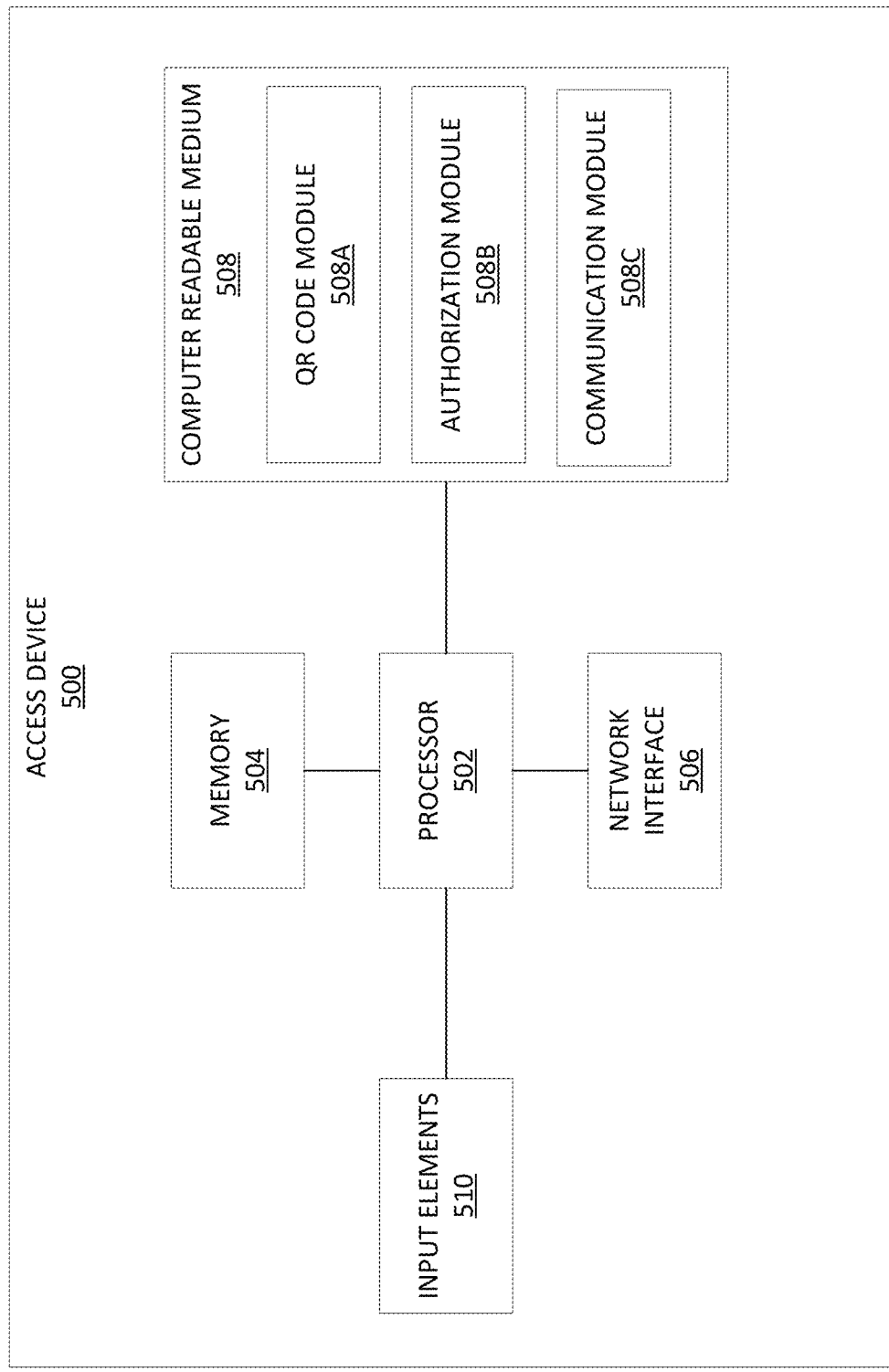
FIG. 5 shows a block diagram of an access device according to an embodiment.

FIG. 5 shows a block diagram of an access device 500. The access device 500 may be operated by a resource provider such as a merchant, a ticket vendor, building security personnel etc. The access device 500 may comprise a processor 502. The processor 502 may be coupled to a memory 504, a network interface 506, a computer readable medium 508, and input elements 510. The computer readable medium 508 may comprise any suitable number and types of software modules.

The memory 504 may be used to store data and code. The memory 504 may be coupled to the processor 502 internally or externally (e.g., via cloud based data storage), and may comprise any combination of volatile and/or non-volatile memory such as RAM, DRAM, ROM, flash, or any other suitable memory device. In some embodiments, the memory 504 may store data such as transaction details, signed challenges, account details, etc.

The network interface 506 may have the same or different features to the previously described network interface 406.

The computer readable medium 508 may comprise code, executable by the processor 502, for a method comprising: receiving, by an access device, a credential or derivative thereof from a user device of a user in a transaction; transmitting, by the access device to an identity server computer, the credential or derivative thereof; receiving, by the access device from the identity server computer, a signed challenge, the signed challenge created by a mobile device of a user; generating, by the access device, an authorization request message, comprising the signed challenge; transmitting, by the access device to a processing network computer, the authorization request message for authorization of the transaction.

The computer readable medium 508 may comprise a number of software modules including, but not limited to, a QR code module 508A, an authorization module 508B, and a communication module 508C.

The QR code module 508A may comprise code that causes the processor 402 to scan and decode QR codes. For example, the QR code module 508A may communicate with input elements 510 to scan a QR code and decode the embedded information. The QR code module 508A may be used to scan a QR code on a user device to receive a, potentially encrypted, card identifier.

The authorization module 508B may comprise code that causes the processor 402 to generate and respond to authorization request messages. For example, the authorization module 508B may be used to generate an authorization request message comprising account details and a signed challenge. The authorization module 508B may additionally identify if a transaction requires further authentication. For example, upon receiving transaction data, the authorization request module may determine a transaction amount in the transaction data is over a limit and generate an authentication request using the transaction data.

The communication module 508C, in conjunction with the processor 502, can generate messages, forward messages, reformat messages, and/or otherwise communicate with other entities. For example, communication module 508C can be used to facilitate communications between the access device 500 and a mobile device, an identity server computer, a processing network computer, etc. The communication module 508C may generate and verify communications between the access device 500 and external devices.

The input elements 510 may be used to complete authentications, transactions, etc. The input elements 510 may comprise a keypad, a camera, etc. For example. A camera of the input elements 510 may be used to scan QR codes.

Figure 6:
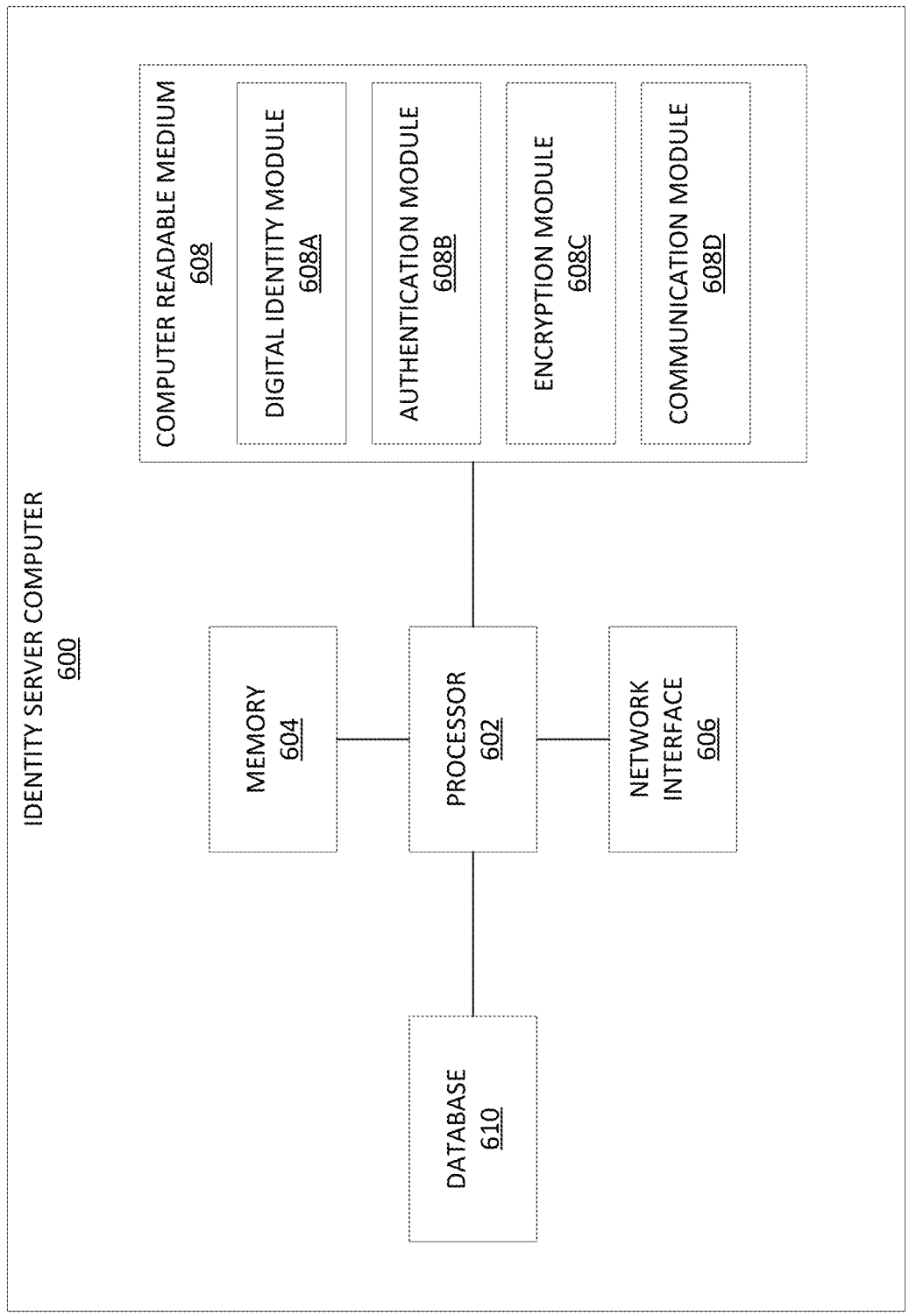
FIG. 6 shows a block diagram of an identity server computer according to an embodiment.

FIG. 6 shows a block diagram of an identity server computer 600. The identity server computer 600 may be operated by an authenticating entity, processing network such as a payment processing network. The identity server computer 600 may comprise a processor 602. The processor 602 may be coupled to a memory 604, a network interface 606, a computer readable medium 608, and a database 610. The computer readable medium 608 may comprise any suitable number and types of software modules.

The memory 604 may be used to store data and code. The memory 604 may be coupled to the processor 602 internally or externally (e.g., via cloud based data storage), and may comprise any combination of volatile and/or non-volatile memory such as RAM, DRAM, ROM, flash, or any other suitable memory device. In some embodiments, the memory 604 may store encryption keys, such as server private encryption keys.

The network interface 606 may have the same or different features to the previously described network interface 406.

The computer readable medium 608 may comprise code, executable by the processor 602, to perform a method comprising: receiving, by an identity server computer, a credential or derivative thereof from an access device in a transaction; responsive to receiving the credential or derivative thereof, transmitting, by the identity server computer, a challenge to a mobile device operated by a user; receiving, by the identity server computer, a signed challenge, wherein the signed challenge is signed using a private key on the mobile device; verifying, by the identity server computer, the signed challenge using a public key associated with the private key; and transmitting, by the identity server computer, the signed challenge or a portion thereof to the access device, wherein the access device generates an authorization request message comprising the signed challenge or the portion thereof.

The computer readable medium 608 may comprise a number of software modules including, but not limited to, a digital identity module 608A, an authentication module 608B, an encryption module 608C, and a communication module 608D.

The digital identity module 608A may comprise code that causes the processor 602 to manage digital identity accounts for a plurality of users. The digital identity module 608A may access the database 610 to manage data relating to digital identity accounts. For example, the digital identity module 608A may add or remove account details, primary account numbers, and public keys to and from the database 610. The digital identity module 608A may access the database 610 using digital identity account identifiers.

The authentication module 608B may comprise code that causes the processor 602 to complete authentication requests. For example, the authentication module 608B may receive authentication requests from an access devices and transmit authentication prompts to mobile devices. The authentication module 608B may generate challenges from data in authentication requests (e.g., transaction details, access details) and verify signed challenges using public keys stored in the database 610.

The encryption module 608C may comprise code that causes the processor 602 to encrypt and decrypt data. For example, the encryption module 608C may allow the identity server computer 600 to generate server key pairs. The encryption module 608C may store the server key pair in the memory 604. The encryption module 608C may access the database 610 to use public keys in digital identity accounts to verify signed challenges.

The communication module 608D, in conjunction with the processor 602, can generate messages, forward messages, reformat messages, and/or otherwise communicate with other entities. For example, communication module 608D can be used to facilitate communications between the identity server computer 600 and a mobile device, an access device, a processing network computer, etc. The communication module 608D may generate and verify communications between the access device 800 and external devices.

The database 610 may be a digital identity database. For example, the database 610 may store data for a plurality of digital accounts of a plurality of users. The data may include digital identity account identifiers, account details, primary account numbers, public encryption keys, etc. The database 610 may or may not be part of the identity server computer 600 itself, or may be linked directly to the identity server computer 600 (e.g., via the cloud or a direct wired connection).

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
  receiving, by an identity server computer, a credential or derivative of the credential from an access device, wherein the credential or the derivative of the credential is encoded, wherein the credential is a user device identifier, and wherein the user device identifier is bound to an account associated with a user;

responsive to receiving the credential or derivative of the credential, transmitting, by the identity server computer, a challenge to a mobile device operated by the user based on the credential for a user device received from the access device, wherein the user device is a card, and wherein the credential or the derivative of the credential is encoded in a QR code on the card to link the account associated with an encrypted user device identifier;

receiving, by the identity server computer from the mobile device, a signed challenge, wherein the signed challenge is signed using a private key stored on the mobile device;

verifying, by the identity server computer, the signed challenge using a public key associated with the private key; and transmitting, by the identity server computer, the signed challenge or a portion of the signed challenge to the access device, wherein the access device generates an authorization request message comprising the signed challenge or the portion of the signed challenge.

2. The method of claim 1, wherein the challenge comprises details of a transaction.

3. The method of claim 1, wherein the access device transmits the authorization request message to a processing network computer, the method further comprises:
receiving, by the identity server computer from the processing network computer, a primary account number and the signed challenge or a portion of the signed challenge;
validating, by the identity server computer, the signed challenge; and
providing a notification to the processing network computer that the signed challenge is valid.

4. The method of claim 1, wherein the access device transmits the authorization request message to a processing network computer, and the method further comprises:
receiving, by the identity server computer from the processing network computer, a primary account number and the signed challenge or portion of the signed challenge;
retrieving, by the identity server computer, a stored signed challenge or a portion of the stored signed challenge from a database using the primary account number;
validating, by the identity server computer, the signed challenge or the portion of the signed challenge from the processing network computer matches the stored signed challenge or the portion of the stored signed challenge from the database; and
providing a notification to the processing network computer that the signed challenge or portion of the signed challenge received from the processing network computer is valid.

5. The method of claim 1, wherein the access device provides access to a secure location.

6. The method of claim 1, wherein transmitting, by the identity server computer, the signed challenge or the portion of the signed challenge to the access device comprises transmitting, by the identity server computer, the signed challenge to the access device.

7. The method of claim 1, wherein before receiving the signed challenge, the user was authenticated by the mobile device using a biometric template stored in the mobile device.

8. The method of claim 1, wherein before receiving the signed challenge, the user was authenticated by the mobile device using a secret stored in the mobile device.

9. The method of claim 1, wherein the credential or the derivative of the credential is the encrypted user device identifier that identifies the user device.

10. The method of claim 9, wherein the encrypted user device identifier was formed by the identity server computer, which encrypted the user device identifier associated with the user device.

11. The method according to claim 1, wherein the identity server computer receives a binding request binding the user device identifier to the account.

12. The method according to claim 1, wherein communications between the identity server computer and the user device or the access device are contactless.

13. The method according to claim 1, wherein a public-private key pair is generated during a prior registration between the mobile device and the identity server computer and is stored on the mobile device.

14. The method according to claim 1, wherein the QR code is linked to a digital identity account in a digital identity database of the identity server computer.

15. An identity server computer comprising:
a processor; and
a non-transitory computer readable medium comprising instructions executable by the processor to perform operations including:
receiving, by the identity server computer, a credential or derivative of the credential from an access device, wherein the credential or the derivative of the credential is encoded, wherein the credential is a user device identifier, and wherein the user device identifier is bound to an account associated with a user;
responsive to receiving the credential or derivative of the credential, transmitting, by the identity server computer, a challenge to a mobile device operated by the user based on the credential for a user device received from the access device, wherein the user device is a card, and wherein the credential or the derivative of the credential is encoded in a QR code on the card to link the account associated with an encrypted user device identifier;
receiving, by the identity server computer from the mobile device, a signed challenge, wherein the signed challenge is signed using a private key stored on the mobile device;
verifying, by the identity server computer, the signed challenge using a public key associated with the private key; and
transmitting, by the identity server computer, the signed challenge or a portion of the signed challenge to the access device, wherein the access device generates an authorization request message comprising the signed challenge or the portion of the signed challenge.

16. The identity server computer of claim 15, wherein the access device transmits the authorization request message to a processing network computer, and wherein the operations further comprise:
receiving, by the identity server computer from the processing network computer, a primary account number and the signed challenge or portion of the signed challenge;
validating, by the identity server computer, the signed challenge; and
providing a notification to the processing network computer that the signed challenge is valid.

17. A method comprising:
receiving, by an access device, a credential or derivative of the credential from a user device of a user, wherein the credential or the derivative of the credential is encoded, wherein the credential is a user device identifier, and wherein the user device identifier is bound to an account associated with the user;

transmitting, by the access device to an identity server computer, the credential or derivative of the credential, wherein the user device is a card, and wherein the credential or the derivative of the credential is encoded in a QR code on the card to link the account associated with an encrypted user device identifier;

receiving, by the access device from the identity server computer, a signed challenge, the signed challenge created by a mobile device of the user, wherein a challenge is transmitted to the mobile device of the user based on the credential from the user device;

generating, by the access device, an authorization request message, comprising the signed challenge; and transmitting, by the access device to a processing network computer, the authorization request message for authorization.

18. The method of claim 17, further comprising:
receiving an authorization response message from the processing network computer.

19. The method of claim 17, wherein the authorization request message further comprises a primary account identifier.

20. The method of claim 17, wherein the signed challenge was created by the mobile device after the mobile device authenticates the user using authentication data stored in the mobile device.

* * * * *